United States Patent
Han et al.

(10) Patent No.: US 11,247,528 B2
(45) Date of Patent: Feb. 15, 2022

(54) SIX-WAY VALVE AND VEHICLE THERMAL MANAGEMENT SYSTEM HAVING THE SAME

(71) Applicants: HYUNDAI MOTOR COMPANY, Seoul (KR); KIA MOTORS CORPORATION, Seoul (KR)

(72) Inventors: Jong Wan Han, Suwon-si (KR); Joo Yeon Kim, Seoul (KR); Yeon Man Jeong, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 198 days.

(21) Appl. No.: 16/601,988

(22) Filed: Oct. 15, 2019

(65) Prior Publication Data

US 2020/0171914 A1 Jun. 4, 2020

(30) Foreign Application Priority Data

Dec. 3, 2018 (KR) ........................ 10-2018-0153836

(51) Int. Cl.
*B60H 1/00* (2006.01)
*F16K 11/00* (2006.01)

(52) U.S. Cl.
CPC ..... *B60H 1/00278* (2013.01); *B60H 1/00385* (2013.01); *B60H 1/00485* (2013.01); *B60H 1/00885* (2013.01); *F16K 11/00* (2013.01); *B60H 2001/00307* (2013.01)

(58) Field of Classification Search
CPC ............ B60H 1/00278; B60H 1/00485; B60H 1/00885; B60H 1/00385; B60H 2001/00307; F16K 11/00; F16K 11/072; F16K 11/08; F25B 2313/0276
See application file for complete search history.

(56) References Cited

U.S. PATENT DOCUMENTS

| | | | | | |
|---|---|---|---|---|---|
| 1,729,623 | A | * | 10/1929 | McKee | ................... F23L 15/02 137/250 |
| 5,375,622 | A | * | 12/1994 | Houston | ............... F16K 11/076 137/240 |
| 5,634,352 | A | * | 6/1997 | Nagai | ..................... F25B 41/26 62/324.6 |
| 9,371,921 | B2 | * | 6/2016 | Whitaker | .............. F16K 11/085 |

(Continued)

*Primary Examiner* — Kun Kai Ma
(74) *Attorney, Agent, or Firm* — Lempia Summerfield Katz LLC

(57) ABSTRACT

A vehicle thermal management system for significantly improving thermal management performance includes a first group including a battery, a second group including one or more power electronics (PE) components, a plurality of cooling lines in thermal communication with an air-cooled radiator, and a six-way valve. The six-way valve includes a housing having a plurality of inlets and a plurality of outlets, a valve member mounted to be rotatable in the housing, and an actuator driving the valve member. The housing has a plurality of passages allowing the plurality of inlets to selectively communicate with the plurality of outlets by rotation of the valve member. In addition, the plurality of passages include a plurality of inner passages formed in an interior space of the housing, and a plurality of outer passages formed in an exterior space of the housing.

9 Claims, 15 Drawing Sheets

(56) References Cited

U.S. PATENT DOCUMENTS

| | | | | |
|---|---|---|---|---|
| 9,500,299 B2 * | 11/2016 | Morein | ............... | F16K 41/026 |
| 10,344,877 B2 * | 7/2019 | Roche | ................... | B60L 58/27 |
| 2006/0118066 A1 * | 6/2006 | Martins | ............. | F16K 11/0856 |
| | | | | 123/41.08 |
| 2014/0374081 A1 * | 12/2014 | Kakehashi | ............. | B60H 1/04 |
| | | | | 165/202 |
| 2015/0000327 A1 * | 1/2015 | Kakehashi | ........... | F02M 26/28 |
| | | | | 62/434 |
| 2017/0067665 A1 * | 3/2017 | Whitmore | ............ | F16K 27/067 |
| 2019/0203981 A1 * | 7/2019 | Akaiwa | ................. | F25B 41/31 |
| 2021/0048233 A1 * | 2/2021 | Tanaka | .................. | F25B 41/20 |

* cited by examiner

SIX-WAY VALVE AND VEHICLE THERMAL MANAGEMENT SYSTEM HAVING THE SAME

CROSS-REFERENCE TO RELATED APPLICATION

This application claims priority to and the benefit of Korean Patent Application No. 10-2018-0153836, filed on Dec. 3, 2018, which is incorporated herein by reference in its entirety.

FIELD

The present disclosure relates to a vehicle thermal management system with respect to a battery and components related thereto, and various power electronics (PE) components other than the battery.

BACKGROUND

The statements in this section merely provide background information related to the present disclosure and may not constitute prior art.

Recently, as interest in energy efficiency and environmental pollution has increased, development of environmentally friendly vehicles capable of substantially replacing internal combustion engine vehicles is desired. Such environmentally friendly vehicles are divided into electric vehicles using fuel cells or electricity as a drive source, and hybrid vehicles driven using an engine and a battery.

The environmentally friendly vehicles such as electric vehicles and hybrid vehicles mainly use high-voltage batteries to supply and charge electric energy.

Accordingly, the environmentally friendly vehicles include a thermal management system for thermal management of the high-voltage battery, components related to the high-voltage battery such as a charger, and power electronics (PE) components.

Types of the thermal management system are being changed from an air-cooled type to a water-cooled type by considering an increase in energy density of the high-voltage battery.

A water-cooled type thermal management system has a plurality of valves controlling a direction of flow of a coolant, and a plurality of pumps forcibly circulating the coolant. The thermal management system is configured to independently control the plurality of valves and the plurality of pumps according to its operating conditions or the state of the battery.

We have discovered that such a conventional thermal management system has a structure including the plurality of valves, making a piping arrangement including piping layout and piping routing very complicated, and resulting in increases in manufacturing cost and weight.

In addition, since the conventional thermal management system needs to independently control the plurality of valves and the plurality of pumps according to the operating conditions or the state of the battery, its control logic is very complicated.

The above information disclosed in this Background section is only for enhancement of understanding of the background of the present disclosure, and therefore it may contain information that does not form the prior art that is already known to a person of ordinary skill in the art.

SUMMARY

The present disclosure provides a six-way valve and a vehicle thermal management system having the same, capable of significantly improving thermal management performance with respect to a battery and components related thereto, and various power electronics (PE) components.

According to an aspect of the present disclosure, a six-way valve may include a housing having a plurality of inlets and a plurality of outlets, a valve member mounted to be rotatable in the housing, and an actuator driving the valve member. In addition, the housing may have a plurality of passages allowing the plurality of inlets to selectively communicate with the plurality of outlets by rotation of the valve member, and the plurality of passages may include a plurality of inner passages formed in an interior space of the housing, and a plurality of outer passages formed in an exterior space of the housing.

The plurality of inner passages may be disposed around a periphery of the valve member.

The plurality of outer passages may be individually disposed in the exterior space of the housing by a plurality of exterior members.

The valve member may have a pair of opening grooves selectively opening the plurality of inner passages, and a pair of closing projections selectively closing the plurality of inner passages.

The pair of opening grooves and the pair of closing projections may be formed on a lateral edge of the valve member, the pair of opening grooves may be disposed opposite each other, the pair of closing projections may be disposed opposite each other, and the pair of opening grooves may be disposed to be perpendicular to the pair of closing projections.

The valve member may have one or more through holes selectively opening and closing the plurality of outer passages.

According to another aspect of the present disclosure, a vehicle thermal management system may include: a plurality of cooling lines in thermal communication with a first group including a battery, a second group including one or more power electronics (PE) components, and an air-cooled radiator; and a six-way valve connected to the plurality of cooling lines to switch a flow of a coolant.

The plurality of the cooling lines may include a first cooling line in thermal communication with the first group, a second cooling line in thermal communication with the second group, and a third cooling line in thermal communication with the air-cooled radiator.

The six-way valve may include a first inlet connected to an outlet of the first group, a first outlet connected to an inlet of the first group, a second inlet connected to an outlet of the second group, a second outlet connected to an inlet of the second group, a third inlet connected to an outlet of the air-cooled radiator, and a third outlet connected to an inlet of the air-cooled radiator.

The first group may further include a battery chiller, and the battery chiller may be thermally connected to a refrigerant loop of a vehicle air conditioning system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
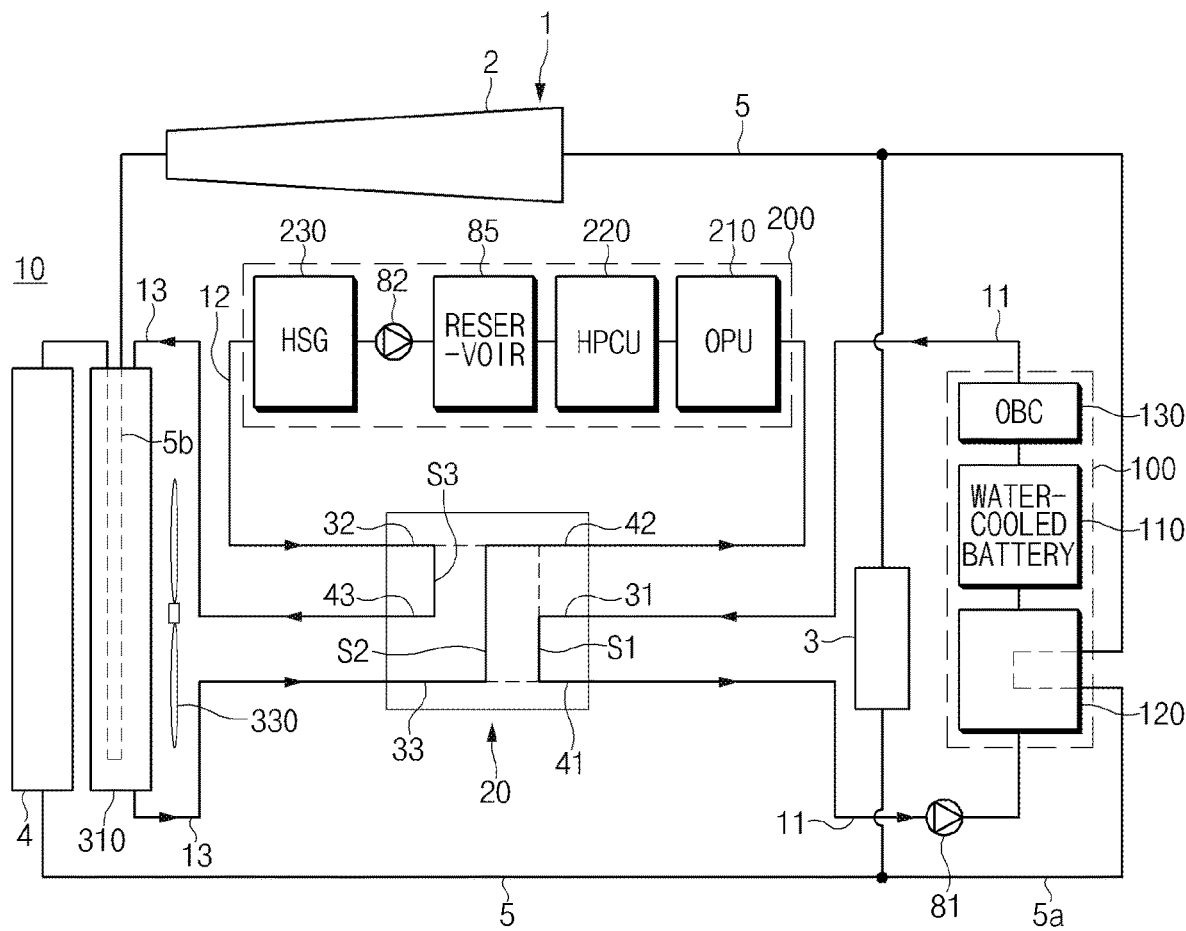
FIG. 1 illustrates the configuration of a vehicle thermal management system according to an exemplary form of the present disclosure, which is in the first cooling mode.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a thermal management system 10 according to an exemplary form of the present disclosure may include a plurality of cooling lines 11, 12, and 13, and a six-way valve 20 connected to the plurality of cooling lines 11, 12, and 13 for switching the flow of a coolant. The plurality of cooling lines may be configured to thermally communicate with a first group including a battery, a second group including one or more power electronics (PE) components, and an air-cooled radiator 310.

The first group 100 may include a battery 110, and the battery 110 may be cooled by the coolant.

According to an exemplary form, the first group 100 may include the battery 110, a battery chiller 120, and a charger 130.

The battery 110 may be a high-voltage battery pack configured to supply power to an electric drive source such as an electric motor of a vehicle. The battery 110 may have a cooling passage (not shown) through which the coolant passes.

The battery chiller 120 may have a cooling passage (not shown) through which the coolant passes, and the battery chiller 120 may be configured to cool the coolant passing through the cooling passage of the battery 110. The battery chiller 120 may be thermally connected to a vehicle air conditioning system 1.

The vehicle air conditioning system 1 may include a refrigerant loop 5, and the refrigerant loop 5 may be configured to connect an electric compressor 2, an evaporator 3, and an air cooled condenser 4. The battery chiller 120 may be thermally connected to the refrigerant loop 5 of the vehicle air conditioning system 1. In detail, the refrigerant loop 5 may have a bypass line 5a, and a portion of the bypass line 5a may be thermally connected to the battery chiller 120. In addition, the battery chiller 120 may have a refrigerant passage (not shown) through which a refrigerant passes, and the bypass line 5a may be connected to the refrigerant passage of the battery chiller 120. As the refrigerant discharged from the condenser 4 of the vehicle air conditioning system 1 passes through the refrigerant passage of the battery chiller 120 through the bypass line 5a of the refrigerant loop 5, the refrigerant may exchange heat with the coolant passing through the cooling passage of the battery chiller 120, so that the coolant passing through the cooling passage of the battery chiller 120 may be appropriately cooled. The bypass line 5a may branch off at a point between the downstream of the air cooled condenser 4 and the upstream of the evaporator 3 and meet at a point between the downstream of the evaporator 3 and the upstream of the compressor 2. Thus, the refrigerant cooled by the air cooled condenser 4 may flow into the refrigerant passage of the battery chiller 120.

The charger 130 may be a charging module such as an on-board charger (OBC) to charge the battery 110, and the charger 130 may have a cooling passage (not shown) through which the coolant passes.

The second group 200 may include a plurality of power electronics (PE) components 210, 220, and 230, and an electric motor (not shown). The second group 200 may include the plurality of components constituting an electric drive system that drives the vehicle, and the plurality of components may be connected in series and/or parallel. For example, as illustrated in FIG. 1, the second group 200 may include a first PE component 210, a second PE component 220, and a third PE component 230. The first PE component 210 may be an oil pump control unit (OPU), the second PE component 220 may be a hybrid power control unit (HPCU), and the third PE component 230 may be a hybrid starter generator (HSG). A reservoir 85 may be disposed between the second PE component 220 and the third PE component 230.

According to an exemplary form, the air-cooled radiator 310 may be disposed to be adjacent to a front grille of the vehicle. When the outside air passes through the front grille of the vehicle, the air-cooled radiator 310 may be cooled by the outside air.

A cooling fan 330 may be disposed to be adjacent to the air-cooled radiator 310. The air-cooled radiator 310 may be thermally connected to the air cooled condenser 4 of the air conditioning system 1. Specifically, a portion 5b of the refrigerant loop 5 of the air conditioning system 1 may be configured to pass through the inside of the air-cooled radiator 310, so that the refrigerant circulating in the refrigerant loop 5 may cool the air-cooled radiator 310.

The plurality of the cooling lines 11, 12, and 13 may include a first cooling line 11 in thermal communication with the first group 100, a second cooling line 12 in thermal communication with the second group 200, and a third cooling line 13 in thermal communication with the air-cooled radiator 310. As the coolant passes through the first cooling line 11, the battery 110, the battery chiller 120, and the charger 130 of the first group 100 may be cooled. As the coolant passes through the second cooling line 12, the PE components 210, 220, and 230 of the second group 200 may be cooled. As the coolant passes through the third cooling line 13, the air-cooled radiator 310 may be cooled.

The thermal management system 10 according to an exemplary form of the present disclosure may have one or more circulating pumps 81 and 82, and the coolant may be forcibly circulated by the circulating pumps 81 and 82.

According to an exemplary form, a first circulating pump 81 may be connected to the first cooling line 11, and the first circulating pump 81 may be disposed to be adjacent to an inlet of the battery chiller 120. A second circulating pump 82 may be connected to the second cooling line 12, and the second circulating pump 82 may be disposed among the PE components 210, 220, and 230 of the second group 200.

The six-way valve 20 may be disposed among the first cooling line 11, the second cooling line 12, and the third cooling line 13, and the six-way valve 20 may be configured to switch the direction of flow of the coolant.

The six-way valve 20 may include a first inlet 31 connected to an outlet of the first group 100, a first outlet 41 connected to an inlet of the first group 100, a second inlet 32 connected to an outlet of the second group 200, a second outlet 42 connected to an inlet of the second group 200, a third inlet 33 connected to an outlet of the air-cooled radiator 310, and a third outlet 43 connected to an inlet of the air-cooled radiator 310.

The six-way valve 20 may control the direction of flow of the coolant by selectively connecting the plurality of inlets 31, 32, and 33 and the plurality of outlets 41, 42, and 43.

According to an exemplary form, the six-way valve 20 may operate to switch the direction of flow of the coolant according to a temperature state of the battery 110.

When the temperature of the battery 110 exceeds a predetermined temperature, the six-way valve 20 may operate, as illustrated in FIG. 1, to allow the first inlet 31 to fluidly communicate with the first outlet 41, allow the second inlet 32 to fluidly communicate with the third outlet 43, and allow the third inlet 33 to fluidly communicate with the second outlet 42 so that the thermal management system 10 may perform the first cooling mode.

In the first cooling mode, the first inlet 31 may communicate with the first outlet 41 to allow an outlet of the charger 130 and the inlet of the battery chiller 120 to be connected so that the first cooling line 11 may form a closed loop which is not connected to the second cooling line 12 and the third cooling line 13. That is, the second cooling line 12 may fluidly communicate with the third cooling line 13, and the first cooling line 11 may be fluidly separated from the second cooling line 12 and the third cooling line 13. The second inlet 32 may communicate with the third outlet 43 to allow an outlet of the third PE component 230 and an inlet of the air-cooled radiator 310 to be connected, and the third inlet 33 may communicate with the second outlet 42 to allow an outlet of the air-cooled radiator 310 and an inlet of the first PE component 210 to be connected so that the second cooling line 12 and the third cooling line 13 may be connected to each other, and the second cooling line 12 and the third cooling line 13 may form a closed loop which is independent of the first cooling line 11. That is, two independent cooling loops may be formed in the first cooling mode. In the first cooling mode, as the coolant cooled by the air-cooled radiator 310 circulates through the second cooling line 12 and the third cooling line 13, the PE components 210, 220, and 230 of the second group 200 may be appropriately cooled. That is, the PE components 210, 220, and 230 of the second group 200 may be cooled by the outside air. As the coolant cooled by the refrigerant of the air conditioning system 1 circulates through the first cooling line 11, the battery 110 and the charger 130 of the first group 100 may be appropriately cooled. That is, the battery 110 and the charger 130 of the first group 100 may be cooled by the air conditioning system 1.

Figure 2:
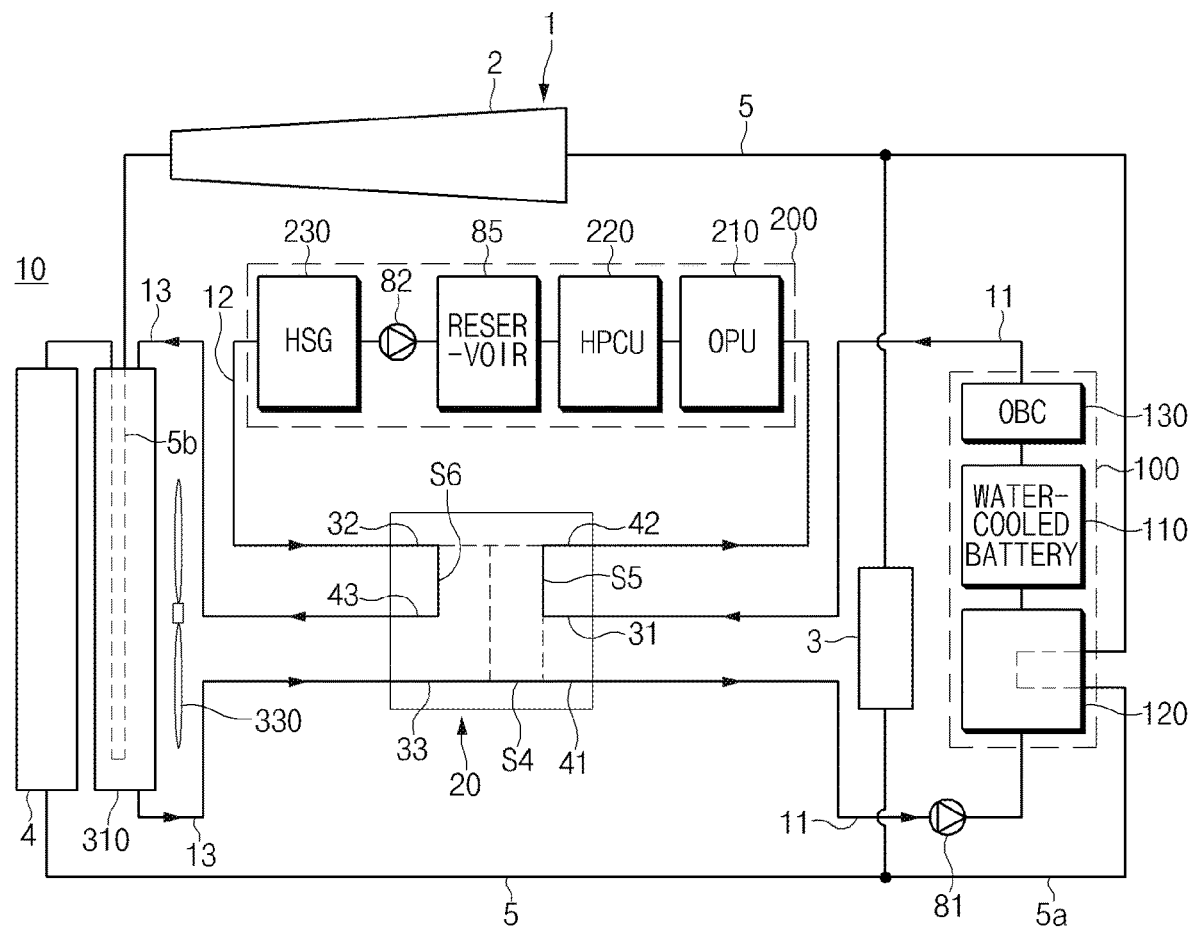
FIG. 2 illustrates the configuration of a vehicle thermal management system according to an exemplary form of the present disclosure, which is in the second cooling mode.

When the temperature of the battery 110 is lower than or equal to the predetermined temperature, the six-way valve 20 may operate, as illustrated in FIG. 2, to allow the first inlet 31 to communicate with the second outlet 42, allow the second inlet 32 to communicate with the third outlet 43, and allow the third inlet 33 to communicate with the first outlet 41 so that the thermal management system 10 may perform the second cooling mode.

In the second cooling mode, the first inlet 31 may fluidly communicate with the second outlet 42 to allow the outlet of the charger 130 and the inlet of the first PE component 210 to be connected, the second inlet 32 may fluidly communicate with the third outlet 43 to allow the outlet of the third PE component 230 and the inlet of the air-cooled radiator 310 to be connected, and the third inlet 33 may fluidly communicate with the first outlet 41 to allow the outlet of the air-cooled radiator 310 and the inlet of the battery chiller 120 to be connected. Thus, the first cooling line 11, the second cooling line 12, and the third cooling line 13 may be connected in series so that a single cooling loop may be formed in the second cooling mode, and the coolant may circulate the first cooling line 11, the second cooling line 12, and the third cooling line 13. As the coolant cooled by the air-cooled radiator 310 passes through the first cooling line 11, the battery 110 and the charger 130 of the first group 100 may be appropriately cooled, and as the coolant discharged from the outlet of the first group 100 continuously passes through the second cooling line 12, the PE components 210, 220, and 230 of the second group 200 may be appropriately cooled. In the second cooling mode, the air conditioning system 1 may not operate so that the battery 110 and the charger 130 of the first group 100 and the PE components 210, 220, and 230 of the second group 200 may only be cooled by the outside air.

Figure 3:
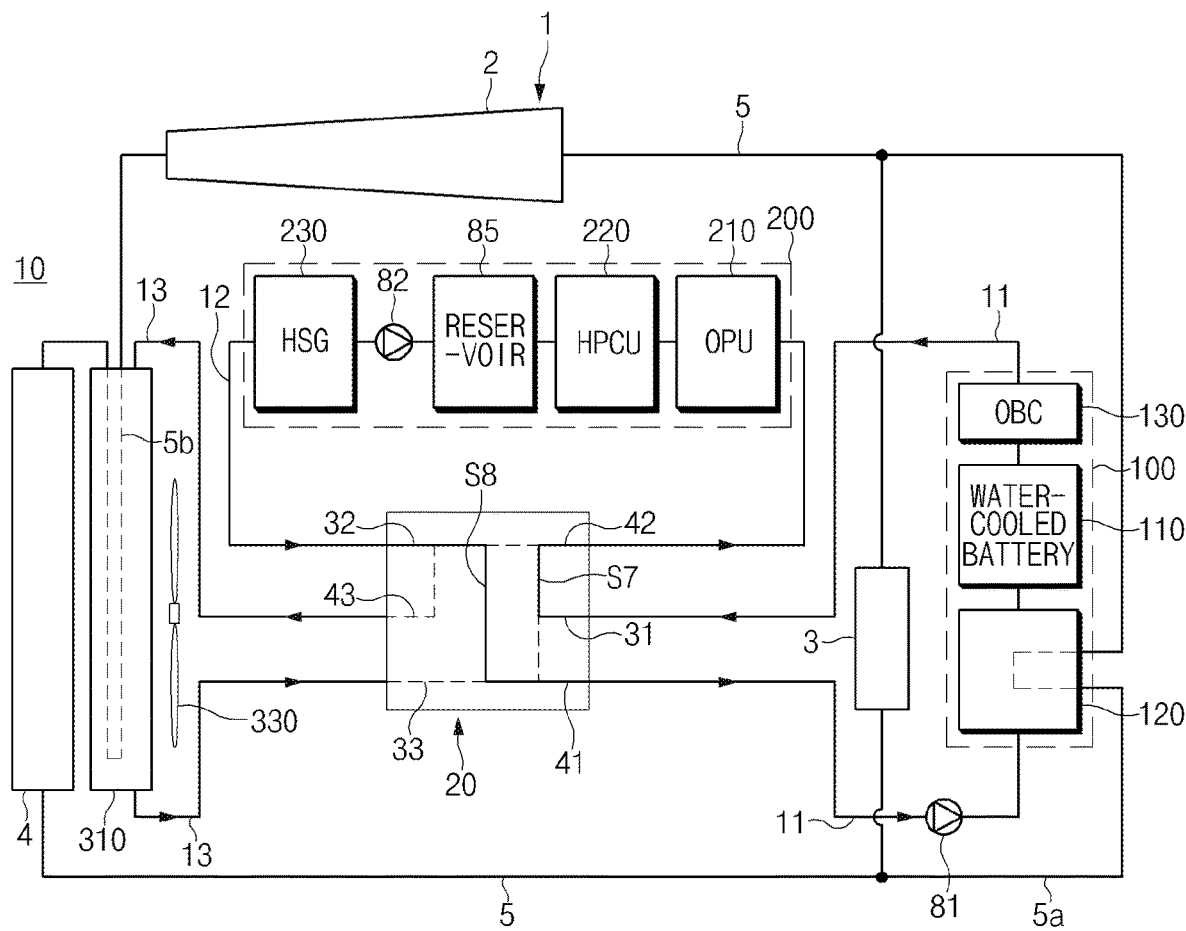
FIG. 3 illustrates the configuration of a vehicle thermal management system according to an exemplary form of the present disclosure, which is in temperature rising mode.
Figure 4:
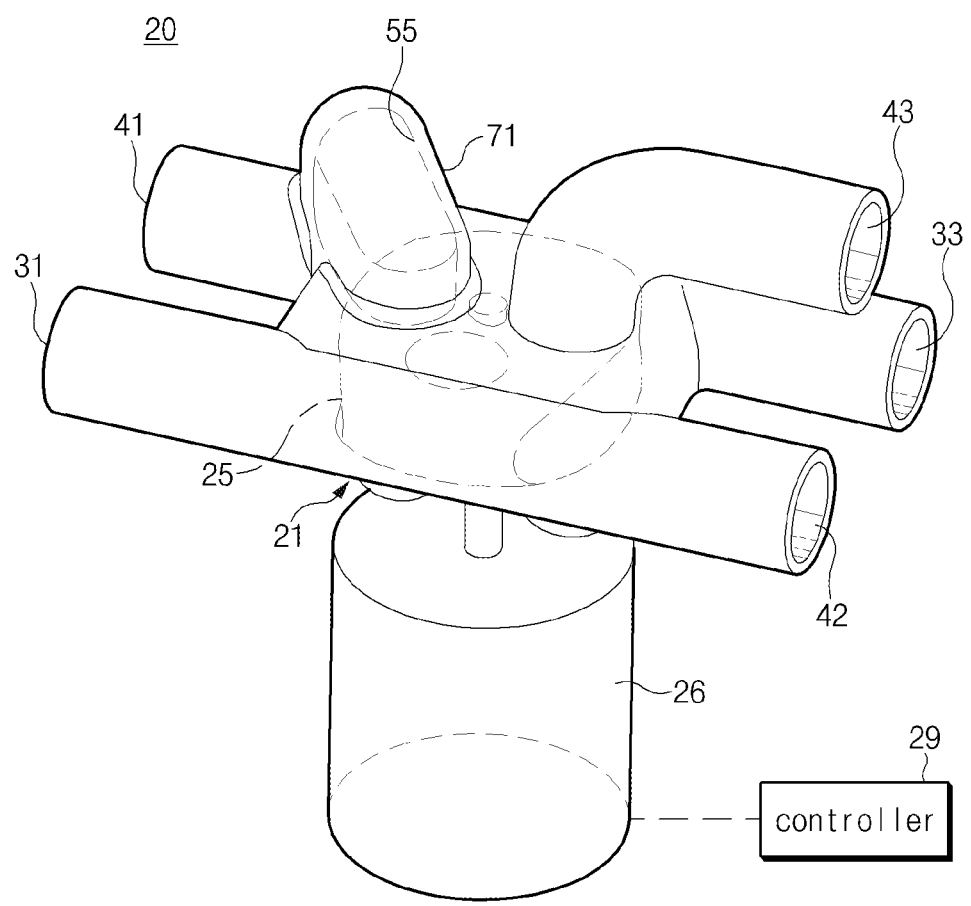
FIG. 4 illustrates a perspective view of a six-way valve according to an exemplary form of the present disclosure.

When it is required to increase the temperature of the battery 110 in cases of very low ambient temperatures such as extremely low environmental temperatures, a temperature rising mode of FIG. 3 may be performed. As illustrated in FIG. 3, the six-way valve 20 may operate to allow the first inlet 31 to fluidly communicate with the second outlet 42, allow the second inlet 32 to fluidly communicate with the first outlet 41, and allow the third outlet 43 to be closed so that the thermal management system 10 may perform the temperature rising mode.

In the temperature rising mode, the first inlet 31 may communicate with the second outlet 42 to allow the outlet of the charger 130 and the inlet of the first PE component 210 to be connected, the second inlet 32 may communicate with the first outlet 41 to allow the outlet of the third PE component 230 and the inlet of the battery chiller 120 to be connected, and the third outlet 43 may be closed to allow the inlet of the air-cooled radiator 310 to be closed, so that the coolant may not flow into the inlet of the air-cooled radiator 310. That is, the first cooling line 11 and the second cooling line 12 may not be connected to the third cooling line 13, and only the first cooling line 11 and the second cooling line 12 may be connected to each other so that the first cooling line 11 and the second cooling line 12 may form a closed loop independent of the third cooling line 13. That is, the first cooling line 11 may fluidly communicate with the second cooling line 12, the first cooling line 11 and the second line 12 may be fluidly separated from the third cooling line 13. As the coolant does not circulate through the cooling line 13, the coolant does not flow into the inlet of the air-cooled radiator 310, and accordingly to the battery 110 and the charger 130 of the first group 100 and the PE components 210, 220, and 230 of the second group 200 may not be cooled by the air-cooled radiator 310 or the air conditioning system 1. As the coolant circulates through the first cooling line 11 and the second cooling line 12, waste heat of the PE components 210, 220, and 230 of the second group 200 may be transferred to the battery 110 of the first group 100, and accordingly the battery 110 and the charger 130 of the first group 100 may be heated to an appropriate temperature.

Referring to FIGS. 4 to 9, the six-way valve 20 according to an exemplary form of the present disclosure may include a housing 21, a valve member 25 rotating in the housing 21, and an actuator 26 driving the valve member 25.

The housing 21 may include an upper half-shell 22 and a lower half-shell 23, and the upper half-shell 22 and the lower half-shell 23 may be coupled by welding, using fasteners, or the like. A first connecting pipe 71 may be connected to a top surface of the upper half-shell 22, and the lower half-shell 23 may have a first communicating hole 57 and a second communicating hole 58.

The housing 21 may have a valve cavity 24 in which the valve member 25 is mounted to be rotatable.

The valve member 25 may be rotated by the actuator 26. The valve member 25 may have a pair of opening grooves 27 and a pair of closing projections 28 on the outer edge thereof. The pair of opening grooves 27 may be disposed opposite each other, i.e. on opposite sides of the valve member 25, and the pair of closing projections 28 may also be disposed opposite each other. The pair of opening grooves 27 may be disposed to be perpendicular to the pair of closing projections 28. That is, the outer side surface of the valve member 25 may alternate between the opening grooves 27 and the closing projections 28.

The valve member 25 may have a first through hole 67 and a second through hole 68 formed in a vertical direction, and due to the rotation of the valve member 25, the first through hole 67 and the second through hole 68 may selectively communicate with the first communicating hole 57 and the second communicating hole 58 of the housing 21. As the first through hole 67 and the second through hole 68 selectively communicate with the first communicating hole 57 and the second communicating hole 58 of the housing 21 by the rotation of the valve member 25, outer passages 55 and 56 may be selectively opened and closed.

The actuator 26 may drive the valve member 25, and a controller 29 may be electrically connected to the actuator 26. The controller 29 (see FIG. 4) may cooperate with a vehicle controller (not shown) to control the actuator 26.

The housing 21 may have the valve cavity 24 in which the valve member 25 is mounted to be rotatable.

The housing 21 may include the first inlet 31, the first outlet 41, the second inlet 32, the second outlet 42, the third inlet 33, and the third outlet 43. The first inlet 31 and the first outlet 41 may extend parallel to each other from the housing 21 in a horizontal direction of the housing 21. The second inlet 32 may extend in a direction perpendicular to the first inlet 31 and the first outlet 41, and the second inlet 32 may be connected to a bottom surface of the housing 21 through a second connecting pipe 72. The second outlet 42 and the third inlet 33 may extend parallel to each other from the housing 21 in the horizontal direction. The third outlet 43 may extend from a top surface of the housing 21, and the third outlet 43 may communicate with the valve cavity 24. For example, the third outlet 43 may be formed of an elbow pipe, and the third outlet 43 may extend parallel to the second outlet 42 and the third inlet 33. In particular, the third outlet 43 may selectively communicate with any one of the first through hole 67 and the second through hole 68 of the valve member 25 by the rotation of the valve member 25.

The housing 21 may have a plurality of passages 51, 52, 53, 54, 55, and 56 allowing the three inlets 31, 32, and 33 and the three outlets 41, 42, and 43 to selectively communicate. The plurality of passages 51, 52, 53, 54, 55, and 56 may include the plurality of inner passages 51, 52, 53, and 54 formed in an interior space of the housing 21, and the plurality of outer passages 55 and 56 formed in an exterior space of the housing 21.

Specifically, the housing 21 may include a first passage 51 allowing the first inlet 31 to selectively communicate with the first outlet 41, a second passage 52 allowing the third inlet 33 to selectively communicate with the second outlet 42, a third passage 53 allowing the first inlet 31 to selectively communicate with the second outlet 42, a fourth passage 54 allowing the third inlet 33 to selectively communicate with the first outlet 41, a fifth passage 55 allowing the second inlet 32 to selectively communicate with the first outlet 41, and a sixth passage 56 allowing the second inlet 32 to selectively communicate with the third outlet 43.

The first passage 51, the second passage 52, the third passage 53, and the fourth passage 54 may be the inner passages formed in the inside of the housing 21. In particular, the first passage 51, the second passage 52, the third passage 53, and the fourth passage 54 may be located around the periphery of the valve member 25. As the valve member 25 rotates, the first passage 51, the second passage 52, the third passage 53, and the fourth passage 54 may be selectively opened and closed by the opening grooves 27 and the closing projections 28 of the valve member 25.

Figure 7:
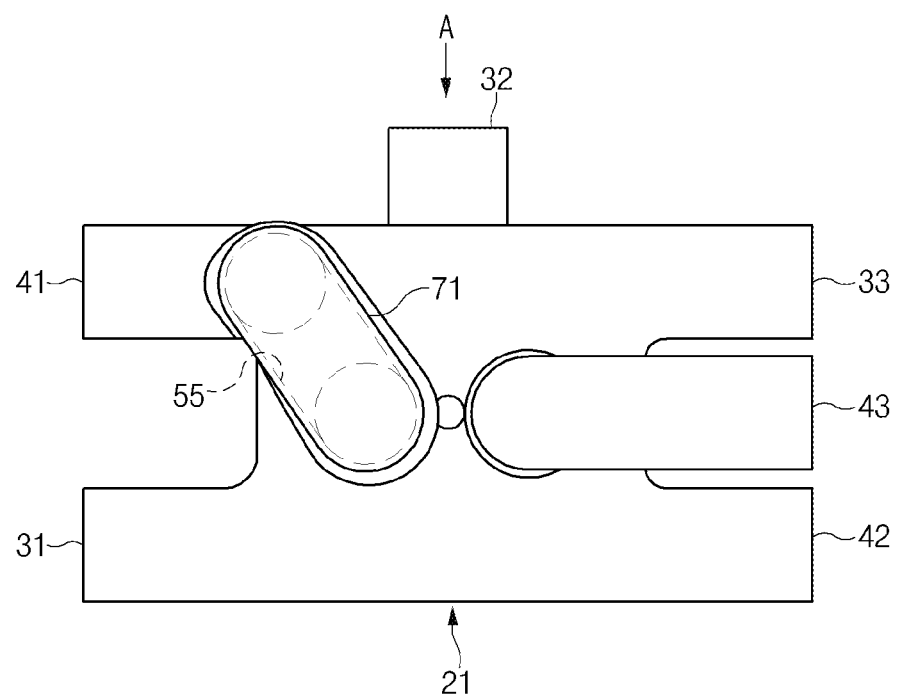
FIG. 7 illustrates a plan view of a six-way valve according to an exemplary form of the present disclosure.

In FIG. 7, the fifth passage 55 may be disposed outside the housing 21 by the first exterior member 71, and the fifth passage 55 may be formed in the inside of the first exterior member 71. The first exterior member 71 may be attached to an exterior surface of the housing 21 in a sealing manner so that the fifth passage 55 may connect the first outlet 41 and the valve cavity 24. One end of the fifth passage 55 may communicate with the first outlet 41, and the other end of the fifth passage 55 may selectively communicate with the first through hole 67 and the second through hole 68 of the valve member 25 by the rotation of the valve member 25. As illustrated in FIGS. 4, 6, 7, and 9, the first exterior member 71 may be attached to the top surface of the housing 21 in a sealing manner. As the valve member 25 rotates, at least one of the first through hole 67 and the second through hole 68 of the valve member 25 may selectively communicate with the fifth passage 55 so that the fifth passage 55 may be opened and closed.

Figure 5:
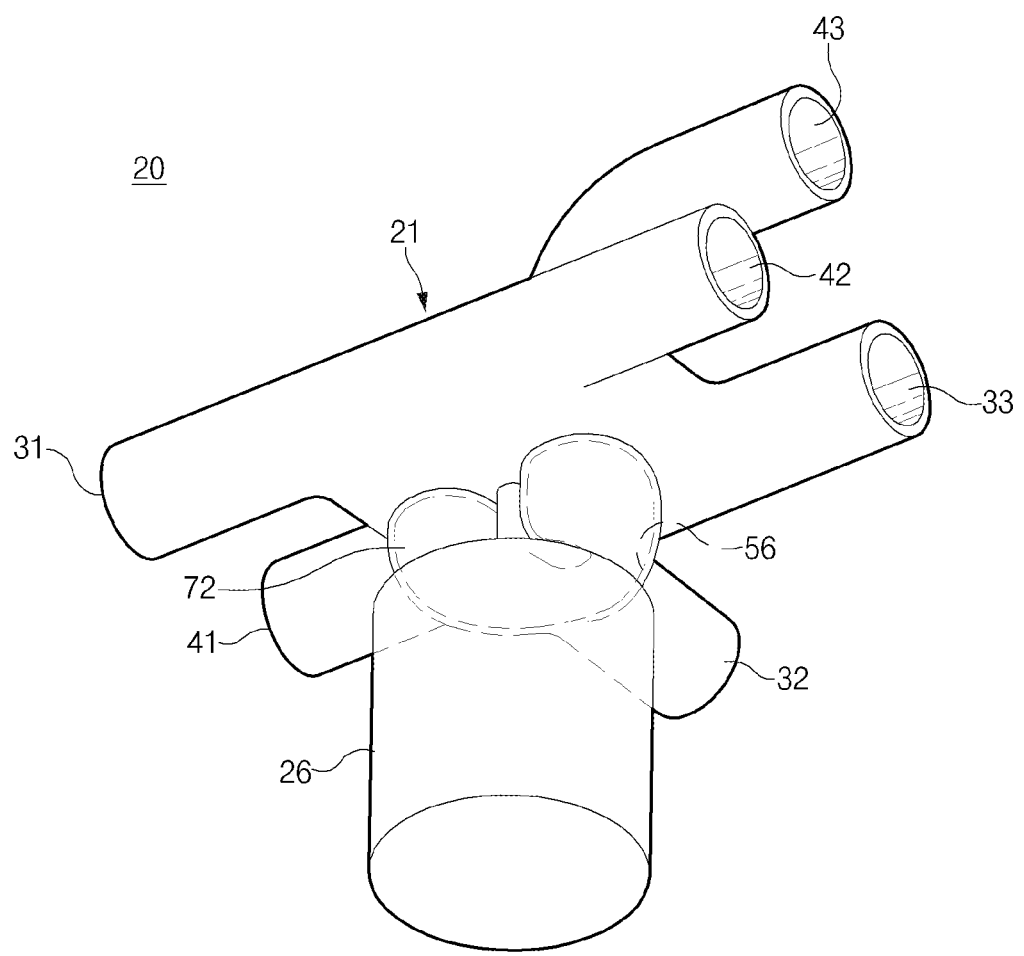
FIG. 5 illustrates a bottom perspective view of a six-way valve according to an exemplary form of the present disclosure.
Figure 6:
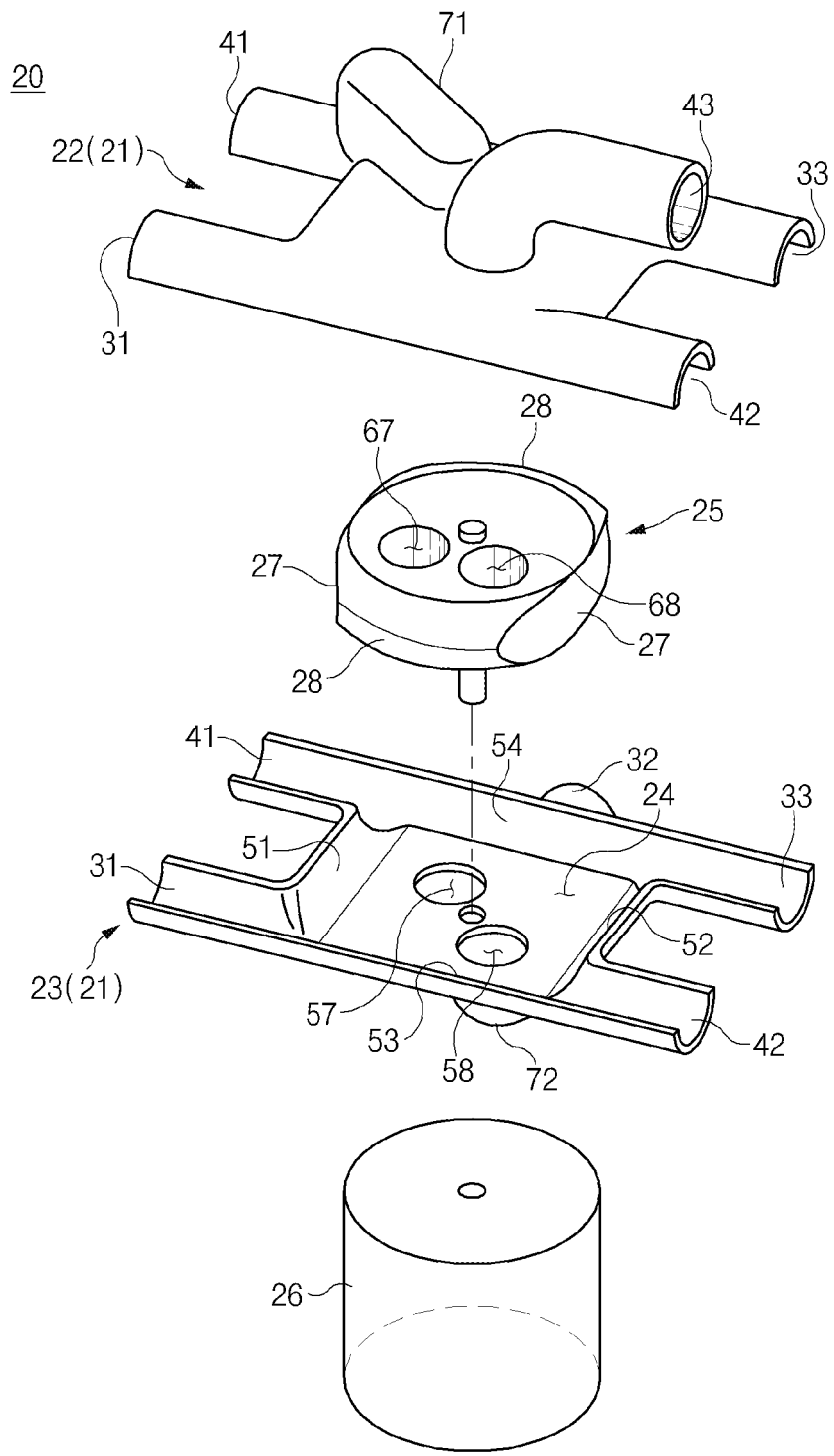
FIG. 6 illustrates an exploded perspective view of a six-way valve according to an exemplary form of the present disclosure.
Figure 8:
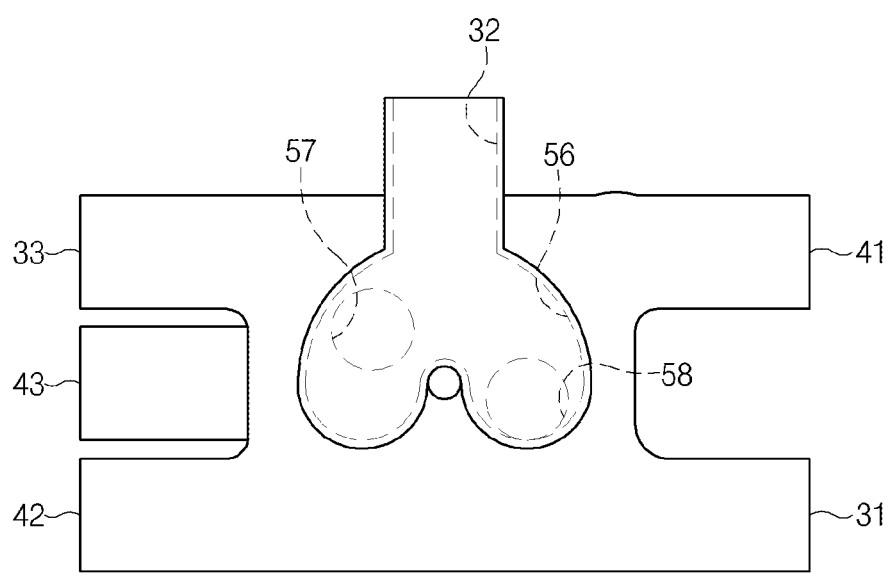
FIG. 8 illustrates a bottom view of a six-way valve according to an exemplary form of the present disclosure.
Figure 9:
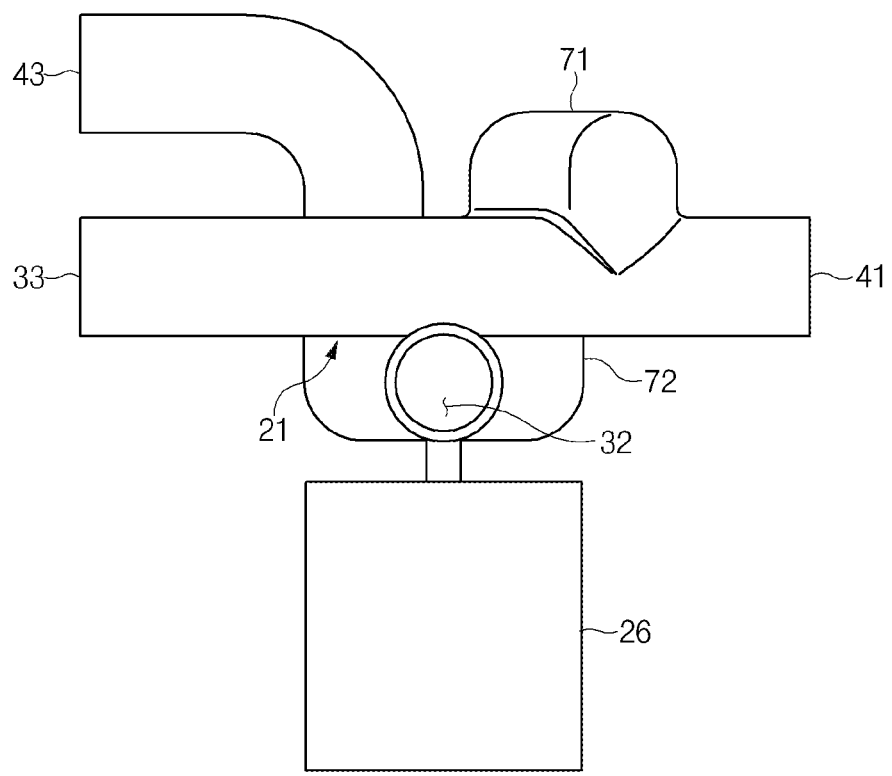
FIG. 9 illustrates a view in a direction of arrow A of FIG. 7.

In FIG. 8, the sixth passage 56 may be disposed outside the housing 21 by the second exterior member 72, and the sixth passage 56 may be formed in the inside of the second exterior member 72. The second exterior member 72 may be attached to the exterior surface of the housing 21 in a sealing manner so that the sixth passage 56 may connect the second inlet 32 and the valve cavity 24. The sixth passage 56 may communicate with the second inlet 32, and the first and second communicating holes 57 and 58 of the housing 21. As illustrated in FIGS. 5, 8, and 9, the second exterior member 72 may be attached to the bottom surface of the housing 21 in a sealing manner. As the valve member 25 rotates, at least one of the first through hole 67 and the second through hole 68 of the valve member 25 may selectively communicate with the sixth passage 56 so that the sixth passage 56 may be opened and closed.

Figure 10:
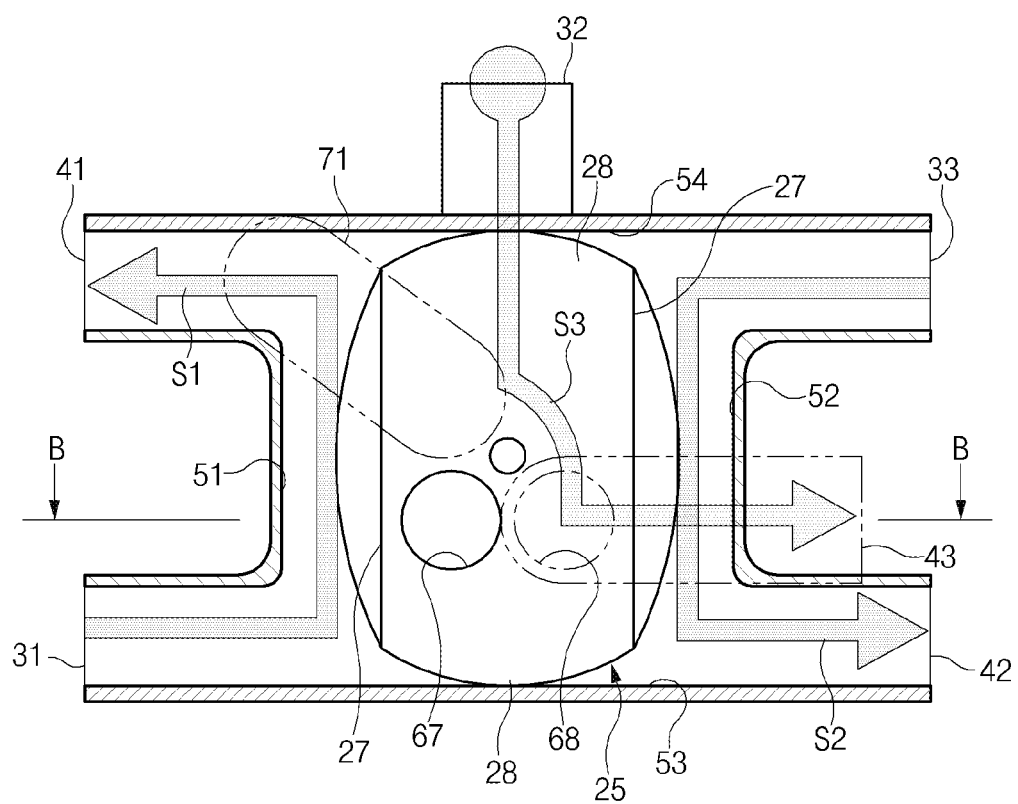
FIG. 10 illustrates a plan cross-sectional view of an operating state of a six-way valve in the first cooling mode of the vehicle thermal management system illustrated in FIG. 1.
Figure 11:
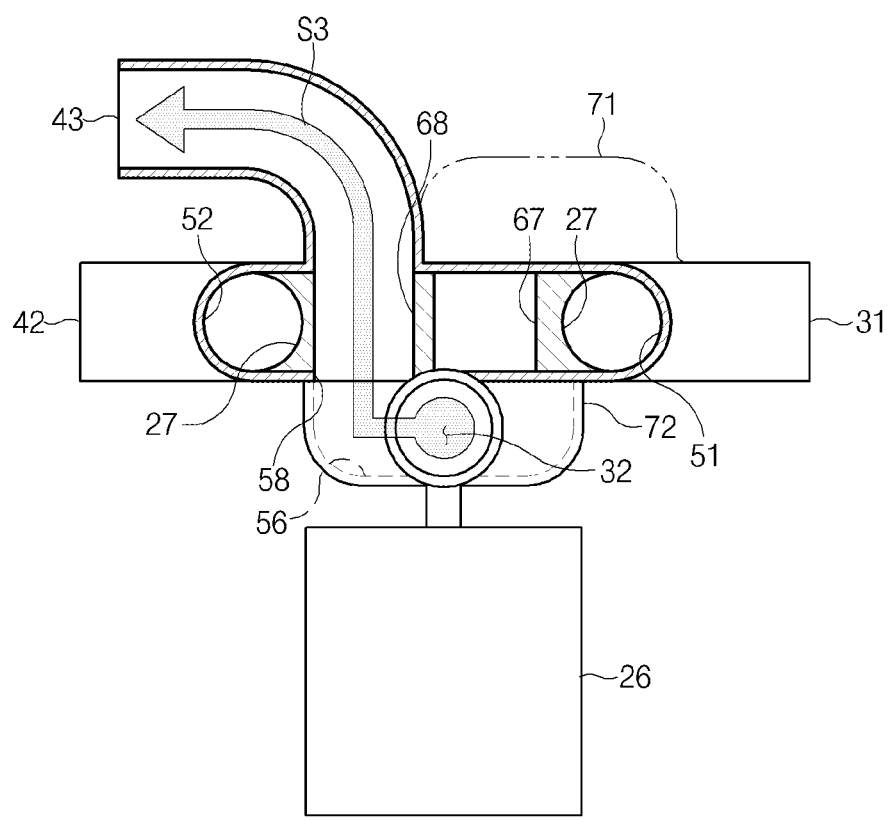
FIG. 11 illustrates a cross-sectional view taken along line B-B of FIG. 10.

To perform the first cooling mode illustrated in FIG. 1, the six-way valve 20 may operate as illustrated in FIGS. 10 and 11. As illustrated in FIGS. 10 and 11, the closing projections 28 of the valve member 25 may be positioned in the third passage 53 and the fourth passage 54 to close the third passage 53 and the fourth passage 54, and the opening grooves 27 of the valve member 25 may be positioned in the first passage 51 and the second passage 52 to open the first passage 51 and the second passage 52. Thus, the first inlet 31 may communicate with the first outlet 41 through the first passage 51 (see arrow 51), and the third inlet 33 may communicate with the second outlet 42 through the second passage 52 (see arrow S2). The second through hole 68 of the valve member 25 may communicate with the second communicating hole 58 and the third outlet 43 of the housing 21 so that the sixth passage 56 may be opened. Thus, the second inlet 32 may communicate with the third outlet 43 through the sixth passage 56 (see arrow S3).

Figure 12:
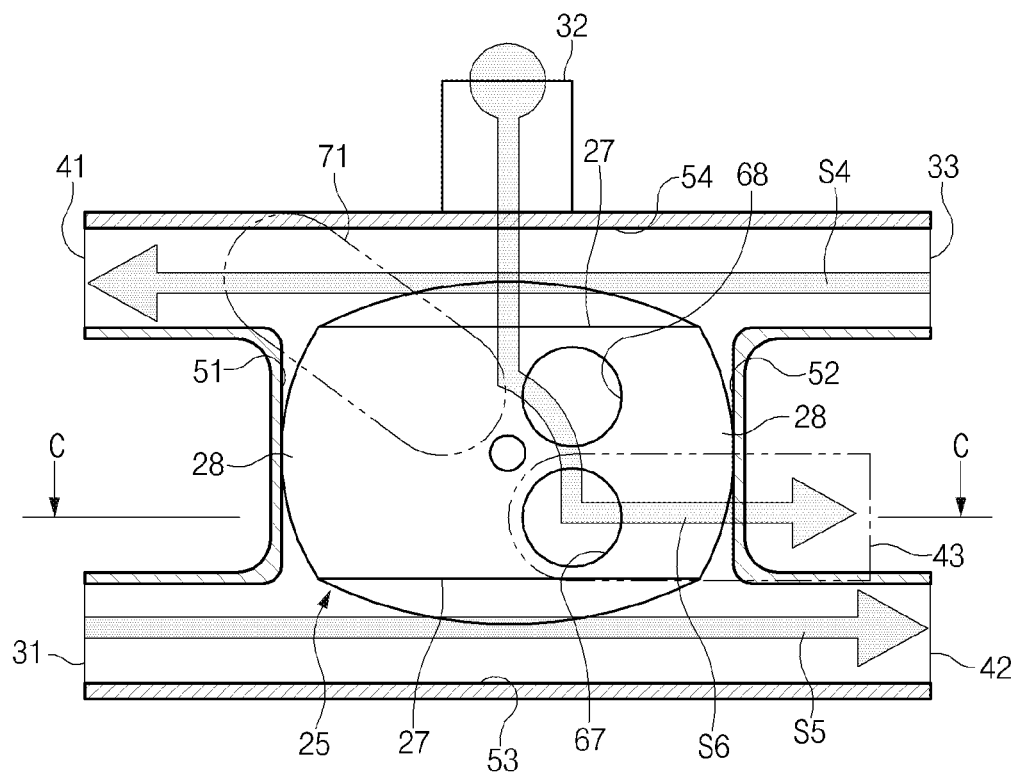
FIG. 12 illustrates a plan cross-sectional view of an operating state of a six-way valve in the second cooling mode of the vehicle thermal management system illustrated in FIG. 2.
Figure 13:
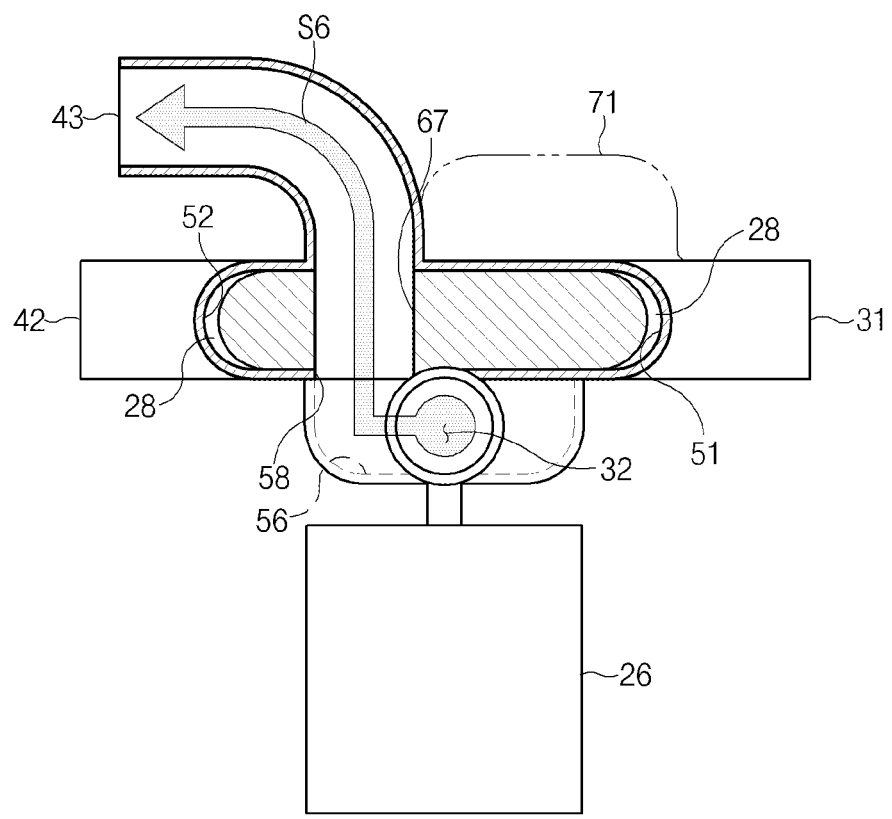
FIG. 13 illustrates a cross-sectional view taken along line C-C of FIG. 12.

To perform the second cooling mode illustrated in FIG. 2, the six-way valve 20 may operate as illustrated in FIGS. 12 and 13 by allowing the valve member 25 in the state illustrated in FIG. 10 to rotate in a counterclockwise direction. As illustrated in FIGS. 12 and 13, the closing projections 28 of the valve member 25 may be positioned in the first passage 51 and the second passage 52 to close the first passage 51 and the second passage 52, and the opening grooves 27 of the valve member 25 may be positioned in the third passage 53 and the fourth passage 54 to open the third passage 53 and the fourth passage 54. Thus, the third inlet 33 may communicate with the first outlet 41 through the fourth passage 54 (see arrow S4), and the first inlet 31 may communicate with the second outlet 42 through the third passage 53 (see arrow S5). The first through hole 67 of the valve member 25 may communicate with the second communicating hole 58 and the third outlet 43 of the housing 21 so that the sixth passage 56 may be opened. Thus, the second inlet 32 may communicate with the third outlet 43 through the sixth passage 56 (see arrow S6).

Figure 14:
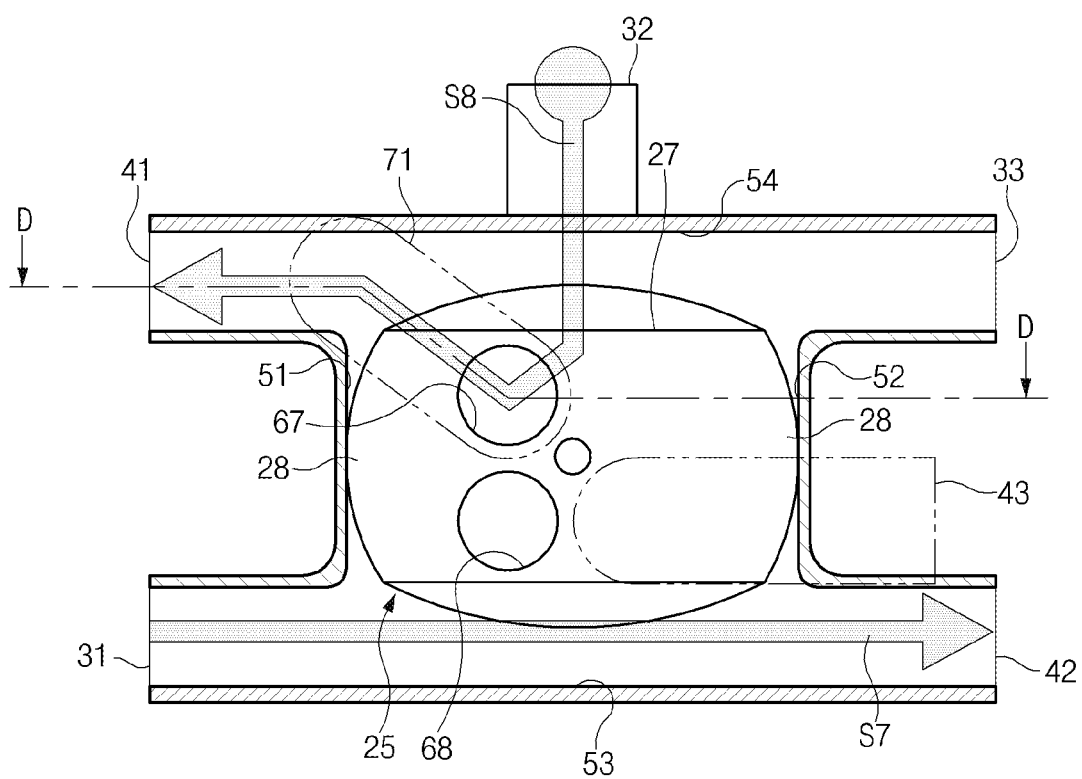
FIG. 14 illustrates a plan cross-sectional view of an operating state of a six-way valve in the temperature rising mode of the vehicle thermal management system illustrated in FIG. 3.
Figure 15:
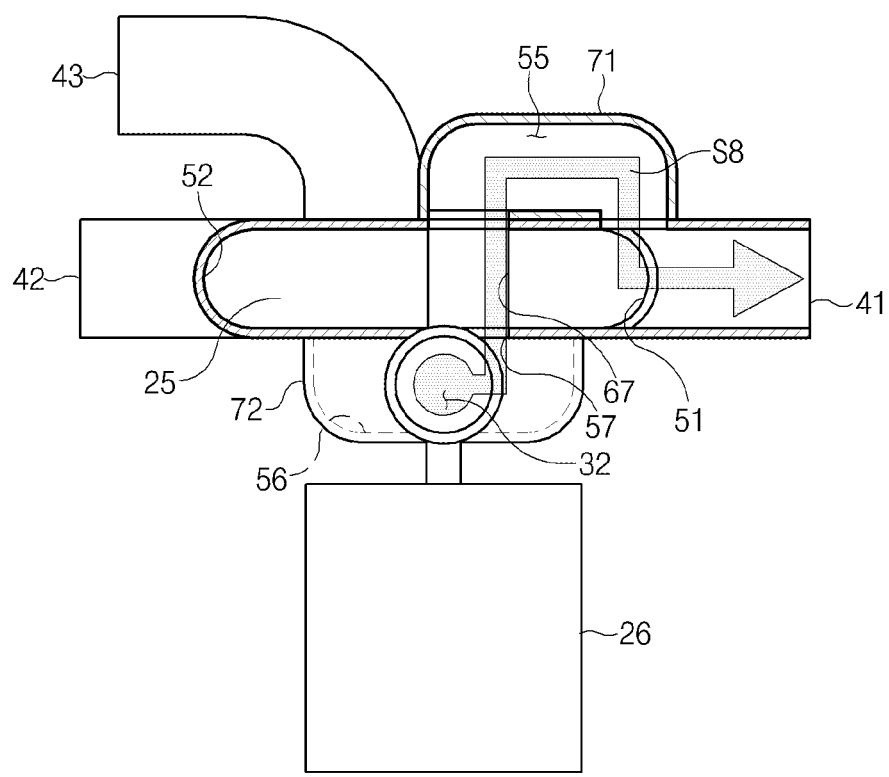
FIG. 15 illustrates a cross-sectional view taken along line D-D of FIG. 14.

To perform the temperature rising mode illustrated in FIG. 3, the six-way valve 20 may operate as illustrated in FIGS. 14 and 15 by allowing the valve member 25 in the state illustrated in FIG. 10 to rotate in a clockwise direction. As illustrated in FIGS. 14 and 15, the closing projections 28 of the valve member 25 may be positioned in the first passage 51 and the second passage 52 to close the first passage 51 and the second passage 52, and the opening grooves 27 of the valve member 25 may be positioned in the third passage 53 and the fourth passage 54 to open the third passage 53 and the fourth passage 54. Thus, the first inlet 31 may communicate with the second outlet 42 through the third passage 53 (see arrow S7). The first through hole 67 of the valve member 25 may communicate with the first communicating hole 57 and the fifth passage 55 of the housing 21 so that the fifth passage 55 may be opened. Thus, the second inlet 32 may communicate with the first outlet 41 through the sixth passage 56 and the fifth passage 55 (see arrow S8). The third outlet 43 may be completely closed by the valve member 25, and thus the inlet-side passage of the air-cooled radiator 310 may be closed. As the inlet-side passage of the air-cooled radiator 310 is closed, the third cooling line 13 may not be connected to the first cooling line 11 and the second cooling line 12. That is, the coolant may not circulate through the third cooling line 13. Meanwhile, any one opening groove 27 of the valve member 25 may be aligned with the fourth passage 54 to open the fourth passage 54, and thus the third inlet 33 may communicate with the first outlet 41 through the fourth passage 54. However, as the third outlet 43 is completely closed by the valve member 25 and the second inlet 32 communicate with the first outlet 41 by the valve member 25, the coolant may not circulate through the third cooling line 13.

The six-way valve 20 may include various passages such as horizontal passages and vertical passages intersecting horizontal passages, therefore the six-way valve 20 may adjust various direction of flow of a coolant.

As set forth above, according to exemplary forms of the present disclosure, thermal management performance with respect to the battery and components related thereto, and various power electronics (PE) components may be significantly improved.

In particular, the piping arrangement of the vehicle thermal management system may be simplified, and the manufacturing cost and weight of the vehicle thermal management system may be reduced. The assembly and mounting of the vehicle thermal management system may be easily implemented.

While the present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:
1. A six-way valve, comprising:
a housing having a plurality of inlets and a plurality of outlets;
a valve member mounted to be rotatable in the housing; and
an actuator driving the valve member, wherein the housing has a plurality of passages allowing the plurality of inlets to selectively communicate with the plurality of outlets by rotation of the valve member, wherein the plurality of passages include a plurality of inner passages formed in an interior space of the housing, and a plurality of outer passages formed in an exterior space of the housing, wherein the valve member has the pair of opening grooves and the pair of closing projections formed on a lateral edge of the valve member, wherein the pair of opening grooves are disposed opposite each other, and the pair of closing projections are disposed opposite each other, and wherein the pair of opening grooves are disposed to be perpendicular to the pair of closing projections.

2. The six-way valve according to claim 1, wherein the plurality of inner passages are disposed around a periphery of the valve member.

3. The six-way valve according to claim 1, wherein the plurality of outer passages are individually disposed in the exterior space of the housing by a plurality of exterior members.

4. The six-way valve according to claim 1, wherein the pair of opening grooves is configured to selectively open the plurality of inner passages, and the pair of closing projections is configured to selectively close the plurality of inner passages.

5. The six-way valve according to claim 1, wherein the valve member has one or more through holes selectively opening and closing the plurality of outer passages.

6. A vehicle thermal management system including the six-way valve according to claim 1, the vehicle thermal management system comprising:
a plurality of cooling lines in thermal commuication with a first group including a battery, a second group including one or more power electronics (PE) components, and an air-cooled radiator; and
the six-way valve connected to the plurality of cooling lines to switch a flow of a coolant.

7. The vehicle thermal management system according to claim 6, wherein the plurality of the cooling lines include a first cooling line in thermal communication with the first group, a second cooling line in thermal communication with the second group, and a third cooling line in thermal communication with the air-cooled radiator.

8. The vehicle thermal management system according to claim 6, wherein the six-way valve includes a first inlet connected to an outlet of the first group, a first outlet connected to an inlet of the first group, a second inlet connected to an outlet of the second group, a second outlet connected to an inlet of the second group, a third inlet connected to an outlet of the air-cooled radiator, and a third outlet connected to an inlet of the air-cooled radiator.

9. The vehicle thermal management system according to claim 6, wherein the first group further includes a battery chiller, and
the battery chiller is thermally connected to a refrigerant loop of a vehicle air conditioning system.

* * * * *